F. HANSON.
ROTARY HARROW.
APPLICATION FILED AUG. 6, 1909.
967,189.
Patented Aug. 16, 1910.
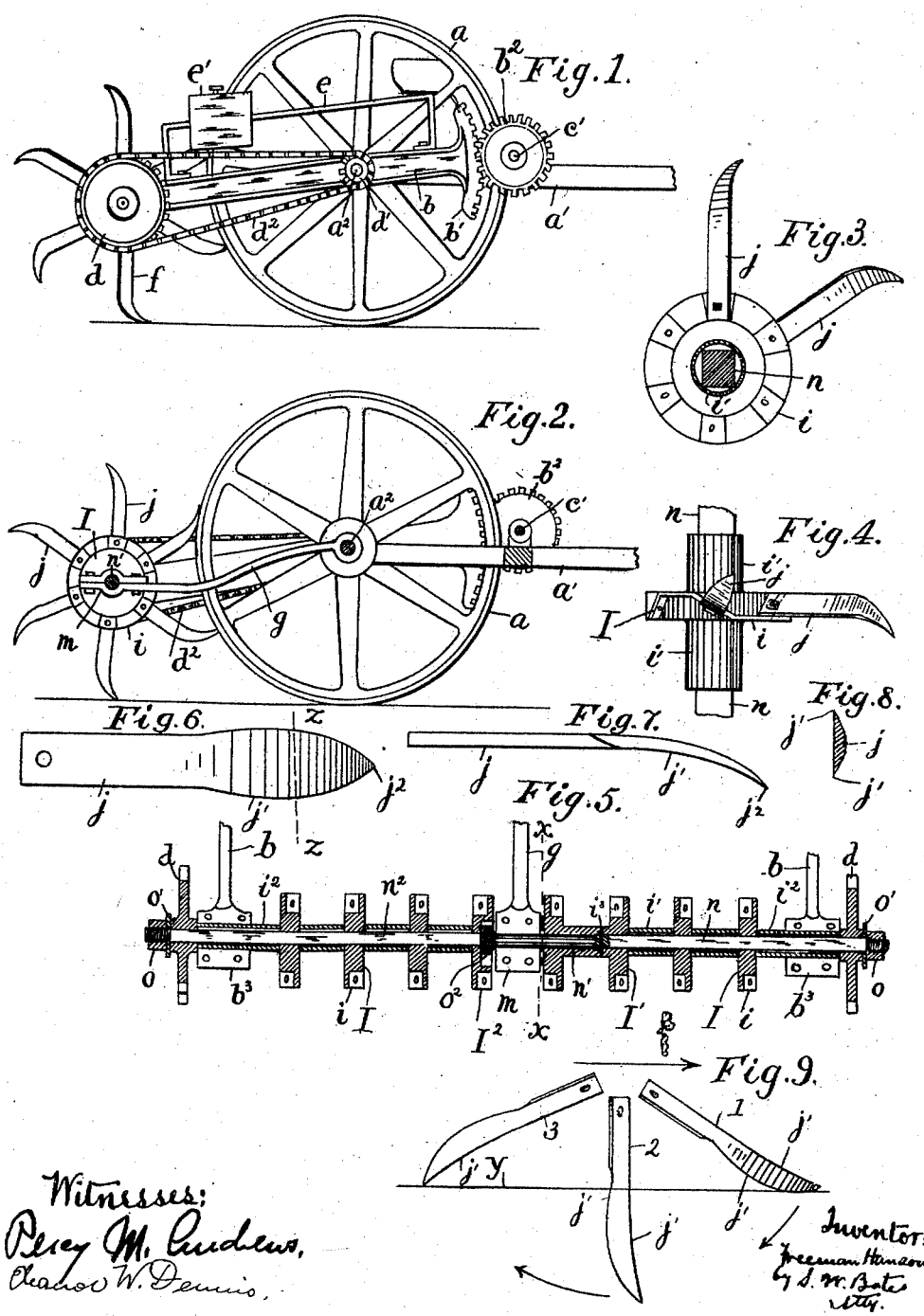

UNITED STATES PATENT OFFICE.

FREEMAN HANSON, OF HOLLIS CENTER, MAINE.

ROTARY HARROW.

967,189.          Specification of Letters Patent.      Patented Aug. 16, 1910.

Application filed August 6, 1909. Serial No. 511,490.

*To all whom it may concern:*

Be it known that I, FREEMAN HANSON, a citizen of the United States of America, and a resident of Hollis Center, in the county of York, State of Maine, have invented certain new and useful Improvements in Rotary Harrows, of which the following is a specification.

My invention relates to a rotary harrow and it relates particularly to certain improved features of construction which I have made in the harrow patented to me May 26, 1903, No. 729,066, Nov. 3, 1903, No. 743,382, Jan. 29, 1907, No. 842,653 and application No. 468,264 filed Dec. 19, 1908. This harrow consists generally of a pair of wheels supporting a suitable frame and having in the rear of the wheels a horizontal harrow shaft provided with blades which are twisted so as to act at an angle with the line of motion. A sprocket chain connects the hub of each wheel with one end of the harrow shaft, the sizes of the sprocket wheels being such that the harrow shaft rotates much more slowly than the wheels. This motion results in dragging the blades horizontally through the ground and causing them to slowly give way to the rear as they come out of the ground. To insure the unequal movement of the wheels when the machine is being turned a pawl and ratchet mechanism was interposed between the shaft and the wheels. In the practical operation of this machine, it is found that there is a very heavy strain exerted on the harrow shaft, this strain being transmitted from the hubs which carry the harrow blades. Another defect of the machine as heretofore made was that unless the blades were worked in the earth deep enough to turn the harrow shaft and the main shaft, the harrow shaft would not revolve at all since the force which turned the harrow was the resistance of its own blades. Thus for use in shallow work such as cultivating, the harrow made as above described with sprockets as shown in my said pending application was not effective. It was also found in my prior machine that the blades being twisted to bring them at the proper angle as they passed through the ground were quite expensive to make.

My present invention is directed to cheapening and improving the construction of the machine in the particulars above referred to and otherwise as will be hereinafter particularly pointed out and claimed.

I illustrate my invention by means of the accompanying drawing in which—

Figure 1 is a side elevation of my harrow, Fig. 2 is a longitudinal section taken on the line $x$ $x$ of Fig. 5, Fig. 3 is a detail elevation of one of the harrow disks with two blades in position, Fig. 4 is a plan of parts shown in Fig. 3, Fig. 5 is a central horizontal section through the harrow shaft and adjacent parts, Fig. 6 is a face view of one of the harrow blades, Fig. 7 is an edge view of the same, Fig. 8 is a section on $z$ $z$ of Fig. 6, and Fig. 9 is a diagram showing the several positions of the blades as the harrow shaft rotates.

In the drawing, $a$ represents one of the wheels, $a'$ is the tongue, $a^2$ the axle, $d'$ the small sprocket wheel secured to the wheel $a$, $d$ is the large sprocket on the end of the harrow shaft and $d^2$ is the sprocket chain. It will be understood that each of the main wheels is provided with a small sprocket wheel $d'$ and that there is one of the large sprocket wheels on each end of the harrow shaft connected with the small sprocket by a chain $d^2$.

The harrow shaft is supported on the rear end of two levers $b$ one pivoted on each end of the main axle $a^2$, the forward end of each lever being formed into a gear segment $b'$ which engages a gear $b^2$, one gear being mounted on each end of a shaft $c'$. Means not shown, are employed for rotating the shaft $c'$ for hoisting and lowering the harrow shaft.

The parts so far described are features of my harrow as described in the patents and application above referred to and constitute no part of my present invention.

In order to force the teeth of the harrow into the ground to a greater or less distance, I provide a weight $e'$ which is slidably supported on a rod $e$ secured above and parallel to the lever $b$. The weight is provided with a suitable set screw by which it is clamped in position. By sliding the weight forward and back more or less weight may be brought on the harrow proper and the depth of the cut regulated.

In the type of harrow herein shown and which is designed to be used for shallow work such as cultivating, the shaft is made in two parts or halves, each half being connected with one of the small sprocket wheels $d'$ by the chain $d^2$. As here shown, the shaft is made up of two sections $n$ and $n^2$, each section being composed of a bar of iron or steel preferably square in cross section, a journal bearing or a joint being formed at or near the center of the harrow shaft to allow each half of the shaft to rotate independently of the other half. The section $n$ has a thread cut on its outer end on which is a nut $o$ bearing against a washer $o'$, inside of the washer being the sprocket wheel $d$.
A journal bearing $b^3$ is formed on the rear end of the lever $b$ and this forms the bearing for one end of the two part shaft. In order to provide the square bar with a cylindrical surface for turning in the bearing, I slip a section of tubing $i^2$ over the bar where it passes through the journal bearing and this tubing forms the journal for one half of the shaft. Inside of the journal $i^2$ the hubs designated generally by I, are placed on the shaft, square holes being cast in the hubs and the square shaft passing through these holes with sections $i'$ of pipe intervening between the hubs to space them properly on the shaft. The outer end of the shaft section $n^2$ is formed in the same manner as the section $n$ with the same arrangement for forming a journal bearing in the end of the other lever $b$.

Each of the hubs I carries a series of blades $j$, these blades being of untwisted steel formed as shown in Figs. 6, 7, 8 and 9 with the end $j^2$ bent forward and pointed and a sharpened cutting edge $j'$ formed on each edge on the lower or working part of the blade. The blade is widened somewhat between the point and the shank to give more effective surface. The blades are secured by means of suitable bolts to surfaces on the hubs which are radial with respect to the hub center and angular as to the direction of motion of the harrow. In practice I form each hub with a zig-zag rib $i$ which extends around the periphery of the hub forming angular surfaces inclining first in one direction and then in another.

A central bearing for the shaft to prevent horizontal displacement is provided. As here shown I make use of a rod $g$ the forward end of which is pivoted to the main shaft while the rear end is formed into a journal bearing $m$ in which runs the inner end of the shaft section $n^2$ this latter being turned down at $n'$ adjacent to the inner end for this purpose.
In order to secure the hub and spacing sections on the shaft $n^2$, I form a screw thread at the base of the turned portion $n'$ on which is a nut $o^2$, the nut lying in a recess formed in the inner side of the hub $I^2$. By turning up on the nut $o^2$ or $o$ or both, the hubs and adjacent parts are securely held on the square shafts.

The bearing for the turning of the section $n^2$ with relation to the section $n$ is formed in the double hub $I'$, the hub and connecting part being formed of a single casting and it is located as shown adjacent to the central shaft bearing $m$. The inner end of the hub $I'$ is bored out to receive the end $n'$ of the shaft section $n^2$ and in the other end is cast a square hole to receive the inner end of the shaft section $n$ which is held in place in the double hub by means of a pin $i^3$. The inner ends of the sections $n$ and $n^2$ abut within the interior of the double hub $I'$ and each section is thus enabled to turn independently of the other section.

In Fig. 9 is shown a diagram illustrating the motion of the blades and the general motion of the harrow, the line $y$ indicating the surface of the ground. The upper arrow represents the general motion of the harrow which tends to move the blades through the soil at all times while the lower arrows indicate the backward motion of the blades. The position marked 1 shows the blade just entering the ground. The cutting edge $j'$ cuts the soil throwing it slightly to one side on account of the angular position of the blade. When the blade reaches position 2 where it is vertical the forward edge $j'$ is still cutting the soil and casting it on one side stirring and agitating it. From position 1 to 2 the forwardly curved point of the blade tends to force the harrow downward and to dispense with weight to hold it down. When the position 3 is reached the blade comes out of the ground and any grass or other material which may have collected on it will be stripped off and the blades will be carried over to act again as the harrow shaft turns.

It will thus be seen that my harrow shaft has great strength, it may be made up of unfinished castings and rolled bars of iron or steel with very little machine work and the blades while they cut and turn aside the turf tend to draw the harrow shaft into the ground. The two parts of the shaft being geared directly to sprockets attached to the independently moving wheels are revolved positively by the wheels and each wheel is free to turn independently of the other wheel.

It is evident that a one piece harrow shaft may be made up of the hubs, the spacing sections and the binding nuts as here shown for a two part shaft.

The device here shown while I have referred to it as a "harrow" may be used as a cultivator or for any other like purpose.

I claim:—

1. In a rotary harrow, the combination of a pair of independently rotatable wheels, a horizontal two part harrow shaft in rear of said wheels, a sprocket on each wheel, a larger sprocket on the end of each shaft section, a sprocket chain connecting the sprocket on each wheel with the sprocket on each shaft.

2. In a rotary harrow the combination of a two part harrow shaft polygonal in cross section, a series of hubs on said shaft having central openings fitting said shaft, harrow blades carried by said hubs, means for securing the hubs on the shaft, a bearing hub having a central cylindrical opening, the inner end of one of the shaft sections being turned to form a cylindrical section to fit in said opening and forming a journal connection therewith, a central journal bearing for said cylindrical portion and a supporting rod connected to the frame of the machine for carrying said bearing.

3. In a rotary harrow, the combination of a pair of wheels a main axle carried thereby, a pair of levers pivoted to said axle, a harrow shaft journaled on the rear ends of said levers, sprocket wheels on the main shaft and on the harrow shaft, sprocket chains connecting said sprocket wheels a guide rod on one of said levers and a slidable weight thereon.

In witness whereof I have hereunto set my hand this 22d day of July, 1909.

FREEMAN HANSON.

Witnesses:
  S. W. BATES,
  ELEANOR W. DENNIS.